US011513813B2

(12) United States Patent
Hamlin et al.

(10) Patent No.: US 11,513,813 B2
(45) Date of Patent: Nov. 29, 2022

(54) INFORMATION HANDLING SYSTEM NOTIFICATION PRESENTATION BASED UPON USER PRESENCE DETECTION

(71) Applicant: Dell Products L.P., Round Rock, TX (US)

(72) Inventors: Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 16/778,787

(22) Filed: Jan. 31, 2020

(65) Prior Publication Data
US 2021/0240493 A1    Aug. 5, 2021

(51) Int. Cl.
| | | |
|---|---|---|
| *G06F 9/4401* | (2018.01) | |
| *G06F 1/3231* | (2019.01) | |
| *G09G 5/00* | (2006.01) | |
| *G06F 3/038* | (2013.01) | |
| *G06F 3/0354* | (2013.01) | |

(52) U.S. Cl.
CPC .......... *G06F 9/4418* (2013.01); *G06F 1/3231* (2013.01); *G06F 3/0383* (2013.01); *G06F 3/03545* (2013.01); *G09G 5/003* (2013.01); *G09G 2330/02* (2013.01); *G09G 2354/00* (2013.01)

(58) Field of Classification Search
None
See application file for complete search history.

(56) References Cited

U.S. PATENT DOCUMENTS

| | | |
|---|---|---|
| 7,714,265 B2 | 5/2010 | Fadell et al. |
| 8,363,098 B2 | 1/2013 | Rosener et al. |
| (Continued) | | |

FOREIGN PATENT DOCUMENTS

| | | |
|---|---|---|
| CA | 2838280 | 12/2012 |
| CN | 103347437 | 10/2013 |
| (Continued) | | |

OTHER PUBLICATIONS

Pidgeon, Elana, "Windows 10 Tip: How to Enable Focus Assist in the Windows Apr. 10, 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.

(Continued)

*Primary Examiner* — Andre L Matthews
(74) *Attorney, Agent, or Firm* — Zagorin Cave LLP; Robert W. Holland

(57) ABSTRACT

End user presence and absence states are determined at an information handling system by analyzing infrared time of flight sensor presence detection information and applying it to manage presentation of notifications at the information handling system, such as operating system notifications and hardware notifications. Notifications are queued when a predetermined user absence state is detected and presented when a predetermined user presence state is detected to that an end user has a greater probability of viewing notifications when the display presents visual images before sleeping for an end user absence and after waking from an end user presence.

20 Claims, 8 Drawing Sheets

(56) References Cited

U.S. PATENT DOCUMENTS

| | | |
|---|---|---|
| 8,593,277 B2 | 11/2013 | Nath et al. |
| 8,760,631 B2 | 6/2014 | Ritter et al. |
| 9,176,559 B2 | 11/2015 | Oh et al. |
| 9,378,342 B2 | 6/2016 | Robison et al. |
| 9,672,627 B1 | 6/2017 | Ramaswamy |
| 10,071,706 B2 | 9/2018 | Ette et al. |
| 10,514,256 B1 | 12/2019 | Kamarshi et al. |
| 10,708,653 B1 | 7/2020 | Stinson et al. |
| 10,819,920 B1 | 10/2020 | Hamlin |
| 2004/0181702 A1 | 9/2004 | Cheng |
| 2006/0271287 A1 | 11/2006 | Gold et al. |
| 2007/0139392 A1* | 6/2007 | Kim .................. G06F 3/03545 345/173 |
| 2011/0310005 A1 | 12/2011 | Chen |
| 2013/0346084 A1 | 12/2013 | Archambault et al. |
| 2014/0085221 A1 | 3/2014 | Kim |
| 2014/0109210 A1* | 4/2014 | Borzycki ................ G06F 21/32 726/7 |
| 2014/0215248 A1 | 7/2014 | Cheng |
| 2014/0333581 A1 | 11/2014 | Cormier, Jr. et al. |
| 2015/0085060 A1 | 3/2015 | Fish |
| 2015/0098174 A1 | 4/2015 | Song et al. |
| 2016/0054436 A1 | 2/2016 | Lee et al. |
| 2016/0127765 A1 | 5/2016 | Robinson |
| 2017/0205876 A1 | 7/2017 | Vidal |
| 2018/0275752 A1 | 9/2018 | Peterson |
| 2018/0321731 A1 | 11/2018 | Alfano et al. |
| 2019/0034609 A1 | 1/2019 | Yang |
| 2019/0379779 A1 | 12/2019 | Zhang |
| 2020/0142471 A1* | 5/2020 | Azam .................... G06F 21/32 |
| 2020/0227004 A1 | 7/2020 | Zuo et al. |
| 2020/0251042 A1 | 8/2020 | Wang et al. |
| 2020/0373810 A1* | 11/2020 | Channaiah ........... G05B 19/042 |
| 2021/0132769 A1 | 5/2021 | Parikh et al. |

FOREIGN PATENT DOCUMENTS

| | | |
|---|---|---|
| EP | 2472424 | 7/2012 |
| GA | 2027515 | 7/2000 |
| NO | 2021047435 | 3/2021 |

OTHER PUBLICATIONS

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,220, filed Oct. 11, 2019, entitled "Information Handling System Proximity Sensor with Mechanically Adjusted Field of View" to Inventors Daniel L. Hamlin et al.

U.S. Appl. No. 16/599,226, filed Oct. 11, 2019, entitled "Information Handling System Infrared Proximity Detection with Frequency Domain Modulation" to Inventors Daniel L. Hamlin et al.

U.S. Appl. No. 16/599,222, filed Oct. 11, 2019, entitled "Information Handling System Infrared Proximity Detection with Distance Reduction Detection" to Inventors Daniel L. Hamlin et al.

U.S. Appl. No. 16/599,224, filed Oct. 11, 2019, entitled "Information Handling System Infrared Proximity Detection with Ambient Light Management" to Inventors Daniel L. Hamlin.

U.S. Appl. No. 16/778,798, filed Jan. 31, 2020, entitled "Information Handling System Peripheral Enhanced User Presence Detection" to Inventors Daniel L. Hamlin et al.

U.S. Appl. No. 16/419,779, filed May 22, 2019, entitled "Augmented Information Handling System User Presence Detection" to Inventors Daniel L. Hamlin et al.

U.S. Appl. No. 16/778,805, filed Jan. 31, 20, entitled "Information Handling System Adaptive User Presence Detection" to Inventors Daniel L. Hamlin et al.

\* cited by examiner

| USE CASE | USE CASE | INPUTS | | | UPD OUTPUT | FALSE DETECT? |
|---|---|---|---|---|---|---|
| | | INDOOR LOCATION? (INPUT) | COLOR XYZ, WHITEPOINT (INPUT) | OTHER LOGICAL CUES... (INPUT) | | |
| | USER AT CUBE USER TEMPORARILY GOES OUT OF FOV | OFFICE CUBE | ... | KEYBOARD ACTIVITY = YES SKYPE AUDIO ACTIVITY = NO | USER ABSENT | YES |
| | USER AT CUBE USER TEMPORARILY GOES OUT OF FOV | OFFICE CUBE | ... | KEYBOARD ACTIVITY = NO SKYPE AUDIO ACTIVITY = YES | USER ABSENT | YES |
| | USER AT CAFE | CAFE (NOON) | ... | ... | USER PRESENT | NO |
| | USER AT CAFE | CAFE (EARLY MORNING) | ... | ... | ... | NO |
| | ... | ... | ... | ... | ... | NO |

FIG. 6

INFORMATION HANDLING SYSTEM NOTIFICATION PRESENTATION BASED UPON USER PRESENCE DETECTION

BACKGROUND OF THE INVENTION

Field of the Invention

The present invention relates in general to the field of information handling systems, and more particularly to an information handling system notification presentation based upon user presence detection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Although portable information handling systems offer convenience for mobile operations, two difficulties with mobile operations include security and battery life. Security presents a unique problem in that a stolen or lost system left in an open operational state can expose end user personal information to access by unauthorized users. To counter this security threat, portable information handling systems typically enter a locked or secure state when not actively used, such as after a predetermined amount of idle time. Once a portable information handling system has a security timeout, the end user typically must enter a password to access the system again. Unfortunately, to avoid the hassle of frequently entering a security code end users tend to set significant security timeout values so that an information handling system may run idle and accessible for many minutes before the display sleeps. In addition to presenting a security weakness, large inactivity timers also contribute to power use and battery charge wear down as the display tends to be one of the system's greatest power consumers.

A recent innovation to enhance information handling system security and battery life is the inclusion of user presence detection (UPD) sensors in the information handling system and peripheral devices, such as peripheral keyboards and displays. In particular, infrared time of flight sensors provide rapid user presence detection capability. Infrared time of flight sensors scan infrared energy in a pattern at an expected end user location and measure reflections to detect objects. Rapid scans and high accuracy allow detection of movement typically associated with animate objects, such as an end user. Rapid end user presence and absence detection allow rapid response time for sleeping a display when an end user leaves and waking the display when the end user returns, thus enhancing system security and battery life while offering the end user with an "always ready" impression.

One difficulty with infrared time of flight sensors is that the rapid presence and absence detection can result in false readings that sleep a display while the end user is near to or even using the system. Another difficulty is that failure to rapidly wake a display from sleep can irritate a user who can become confused as the display sometimes wakes and sometimes must be awoken. Yet premature activation of a display results in unnecessary power consumption and potential security risks. In addition, if a display remains on when an end user is not present, important notifications may be presented at the display that the end user will not see, such as software notifications generated by the operating system and applications and hardware notifications generated by hardware, like a low battery state. One solution to the sensitivity of infrared time of flight sensors is to monitor a presence and absence state transition for a time delay to increase the confidence or probability that the change in state corresponds to an end user presence or absence. The greater the delay in taking action at the information handling system in response to a user presence and absence change of state, the greater the security risk to the information handling system and the greater the impact on battery charge.

SUMMARY OF THE INVENTION

Therefore, a need has arisen for a system and method which adapts end user presence detection based upon operating conditions.

A further need exists for a system and method that applies end user presence detection information from sensors integrated in peripheral devices.

A further need exists for a system and method that manages presentation of notifications based upon end user presence and absence states.

In accordance with the present invention, a system and method are provided which substantially reduce the disadvantages and problems associated with previous methods and systems for managing information handling system end user interactions based upon user presence states and user absence states sensed with a user presence detection sensor, such as an infrared time of flight sensor. User presence detection configuration parameters are adapted based upon operating conditions to enhance confidence that user presence and absence state transitions are accurate. The user presence detection may include plural sensors, such as infrared time of flight sensors integrated in peripheral devices that coordinate configuration and communication of presence detection information through a processor integrated sensor hub and/or an embedded controller that manages peripheral interactions, such as a keyboard controller. Information handling system activities, such as presentation of notifications, are adjusted based upon the user presence and absence state transitions.

More specifically, an information handling system processes information with processing components disposed in a housing, such as a processor that executes instructions stored in memory. The information handling system interfaces with peripheral devices that interact with an end user, such as a keyboard that accepts keyed inputs and a display that presents information as visual images. The information handling system and peripherals integrate user presence detection sensors, such as infrared time of flight sensors, that detect end user presence and absence states to adjust information handling system operations, such as sleeping a display when a user is absent and waking the display when the user is present. In one example embodiment, software and hardware notifications are queued during user absence states independent of display wake or sleep state so that an end user will have the notifications presented when the end user is present and prepared to view the notifications. When peripheral devices include user presence detection sensors, an embedded controller that interfaces with the peripheral devices also aggregates communications with the user presence detection sensors to coordinate determination of end user presence and absence states. Configuration policies are stored for plural different types of parameters that define operating conditions associated with the user presence detection sensors. The configuration policies are monitored and adapted over time as user presence and absence state transitions are validated and invalidated based on end user interactions, such as inputs at input devices.

The present invention provides a number of important technical advantages. One example of an important technical advantage is that an end user has an improved experience of an "always ready" system that wakes when the end user approaches and sleeps when the end user leaves. Infrared time of flight sensor end user presence and absence state transitions have improved confidence by relying upon multiple sensors that cooperate with each other, such as with coordination of relative positions that vary relative to an end user. Higher confidence of user presence detection sensors is provided with adaptive machine learning based upon validation or invalidation of user presence and absence state transitions. Based upon improved user presence detection, information handling system activities, such as presenting notifications at a display, are modified to adapt to end user interactions with the end user experiencing an information handling system that meets the end user's needs in a timely manner. Improved confidence in an infrared time of flight sensor user presence and absence state transition allows more rapid response time to the state transitions so that delays in sleeping and waking a display or information handling system are reduced without increasing false positive and false negative responses that irritate and/or confuse an end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 illustrates an example of a false determination configuration policy that results from machine learning reinforcement;

DETAILED DESCRIPTION

Infrared time of flight sensor presence detection information manages information handling system operating conditions, such as waking and sleeping information presentation, with real time adaption of user presence and absence states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
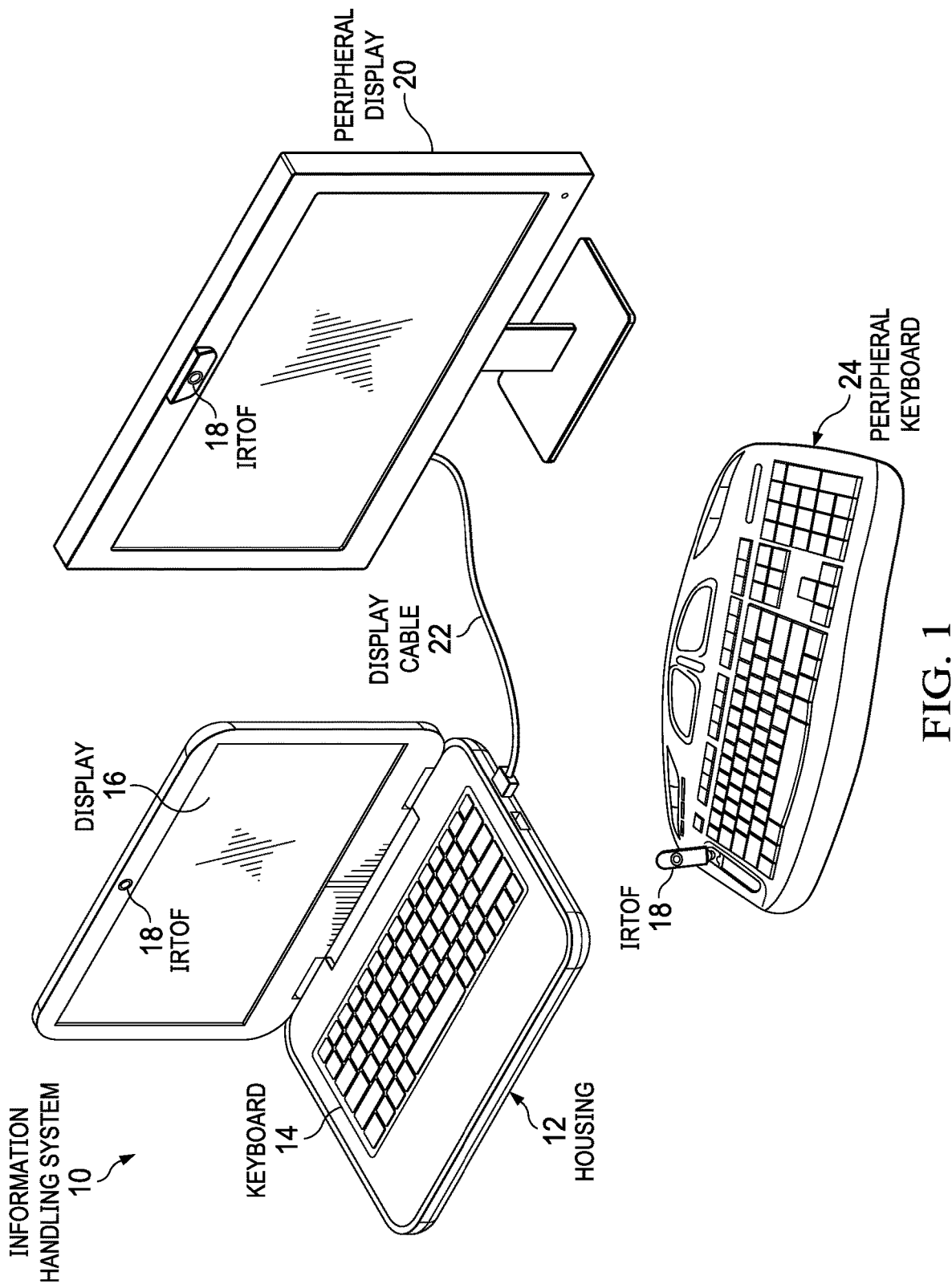
FIG. 1 depicts an information handling system that interacts with plural peripherals having infrared time of flight sensors to adaptively determine end user presence and absence states.

Referring now to FIG. 1, an information handling system 10 interacts with plural peripherals having infrared time of flight sensors 18 to adaptively determine end user presence and absence states. In the example embodiment, information handling system 10 has a portable convertible configuration with processing components disposed in housing 12 having first and second rotationally coupled portions. A base housing portion rests on a support surface and integrates a keyboard 14 that accepts inputs from an end user. A lid housing portion is rotated to an open and raised position to expose a display 16 integrated in housing 12 for presentation of visual images. In addition to integrated display 16, a peripheral display 20 interfaces with information handling system 10 through a display cable 22 to present information as visual images. A peripheral keyboard 24 interfaces with information handling system 10 through a wireless interface, such as Bluetooth, to accept keyed inputs. The example embodiment depicts a portable information handling system 10 with a peripheral keyboard 24 and peripheral display 20, however alternative embodiments may include other peripherals, such as an active stylus to write inputs to a touchscreen display surface or a docking station to coordinate power transfer and peripheral interactions for information handling system 10. In other alternative embodiments, information handling system 10 may have alternative configurations, such as a desktop, tablet or all-in-one configuration.

In the example embodiment, an infrared time of flight sensor, also known as a user presence detection (UPD) sensor, integrates in each of information handling system 10, peripheral display 20 and peripheral keyboard 24 to sense end user presence and absence. Generally, infrared time of flight sensor 18 emits infrared illumination in a scan pattern and detects reflections from objects to determine a distance to the objects. By comparing changes in distance to detected objects over time, the infrared time of flight sensor allows an analysis of whether a detected object is animate, such as an end user, or inanimate, such as fixture near information handling system 10. Infrared time of flight sensors provide timely and sensitive user detection that supports rapid transition of the information handling system from an active state with visual images presented and input devices accepting inputs to a sleep state with the display inactive and input devices password protected. Although infrared time of flight sensors 18 provide a rapid end user presence and absence detection, in some instances the detection implements with too great of a sensitivity so that a false positive end user absence detection results in a display removing visual images. The inventors hereof have addressed these difficulties with improvements described by the following patent applications, which are incorporated herein as though fully set forth:

U.S. patent application Ser. No. 16/419,779, filed May 22, 2019, entitled Augmented Information Handling System User Presence Detection, by inventors Daniel L. Hamlin, et al.

U.S. patent application Ser. No. 16/599,226, filed Oct. 11, 2019, entitled Information Handling System Infrared Proximity Detection with Frequency Domain Modulation, by inventors Daniel L. Hamlin and Vivek Viswanathan Iyer.

U.S. patent application Ser. No. 16/599,224, filed Oct. 11, 2019, entitled Information Handling System Infrared Proximity Detection with Ambient Light Management, by inventors Daniel L. Hamlin and Vivek Viswanathan Iyer.

U.S. patent application Ser. No. 16/599,222, filed Oct. 11, 2019, entitled Information Handling System Infrared Proximity Detection with Distance Reduction Detection, by inventors Daniel L. Hamlin, et al.

U.S. patent application Ser. No. 16/599,220, filed Oct. 11, 2019, entitled Information Handling System Proximity Sensor with Mechanically Adjusted Field of View, by inventors Daniel L. Hamlin et al.

In the example embodiment, peripheral devices with integrated infrared time of flight sensors 18 enhance end user presence and absence detection in a variety of ways. In some instances, peripheral device infrared time of flight sensors 18 operate as "smart" sensors that self-determine end user absence and presence to apply at the peripheral, such as to control a display output based upon user presence and absence detected at the display. In other instances, or in addition to "smart" determinations, peripheral device infrared time of flight sensors detect raw data, such as distances in scan areas, that is forwarded to information handling system 10 to allow a user presence and absence determination. In either implementation, by interfacing available sensed conditions at a peripheral device infrared time of flight sensor with an information handling system 10, greater certainty becomes possible with respect to user presence and absence state determinations. As one example, a peripheral infrared time of flight sensor 18 typically remains in a fixed position relative to an end user during end user presence while information handling system 10 may vary the orientation of its integrated infrared time of flight sensor substantially based upon the housing rotational orientation. For instance, an excessive rotational angle of housing 12 may direct the integrated infrared time of flight sensor off-axis from an expected end user position while an end user viewing a peripheral display 20 remains squarely within the peripheral display's infrared time of flight sensor 18 scan. As another example, in a docked configuration coupled to a docking station, information handling system 10 may have the housing 12 in a closed position so that its infrared time of flight sensor 18 is covered up. In such an instance, the availability of one or more peripherals with integrated infrared time of flight sensors 18 enhance the context of information handling system 10 to provide more reliable transitions between end user presence and absence states.

As is described in greater depth below, changes in operating conditions detected at information handling system 10 result in real time adaption of user presence and absence configuration parameters. For instance, a comparison of sensed information from plural infrared time of flight sensors enhances the certainty with which a particular end user presence and absence determination may be applied. In one example embodiment, distance information detected by each of plural time of flight sensors 18 is communicated to a shared location, such as information handling system 10, so that each infrared time of flight sensor's relative position to an end user may be estimated, thus allowing resolution of the relative positions of the infrared time of flight sensors to each other, such as with triangulation. Once the relative positions of the infrared time of flight sensors 18 are known, a comparison of each infrared time of sensor 18 sensed data helps to identify activity and velocity of the end user to clarify the end user's intent relating to usage of information handling system 10. Based upon probabilities of an end user presence and absence state as determined by one or more infrared time of flight sensors and validation of the end user presence and absence state by subsequent end user interactions, configuration parameters may be updated for a detected context, such as physical location, time of day, environmental condition, etc. . . . . With enhanced probability accuracy relating to end user presence and absence state determinations, actions and activities at the information handling system may be adapted for a detected context, such as by managing notification presentations at an information handling system independently of presentation of visual images at a display.

Figure 2:
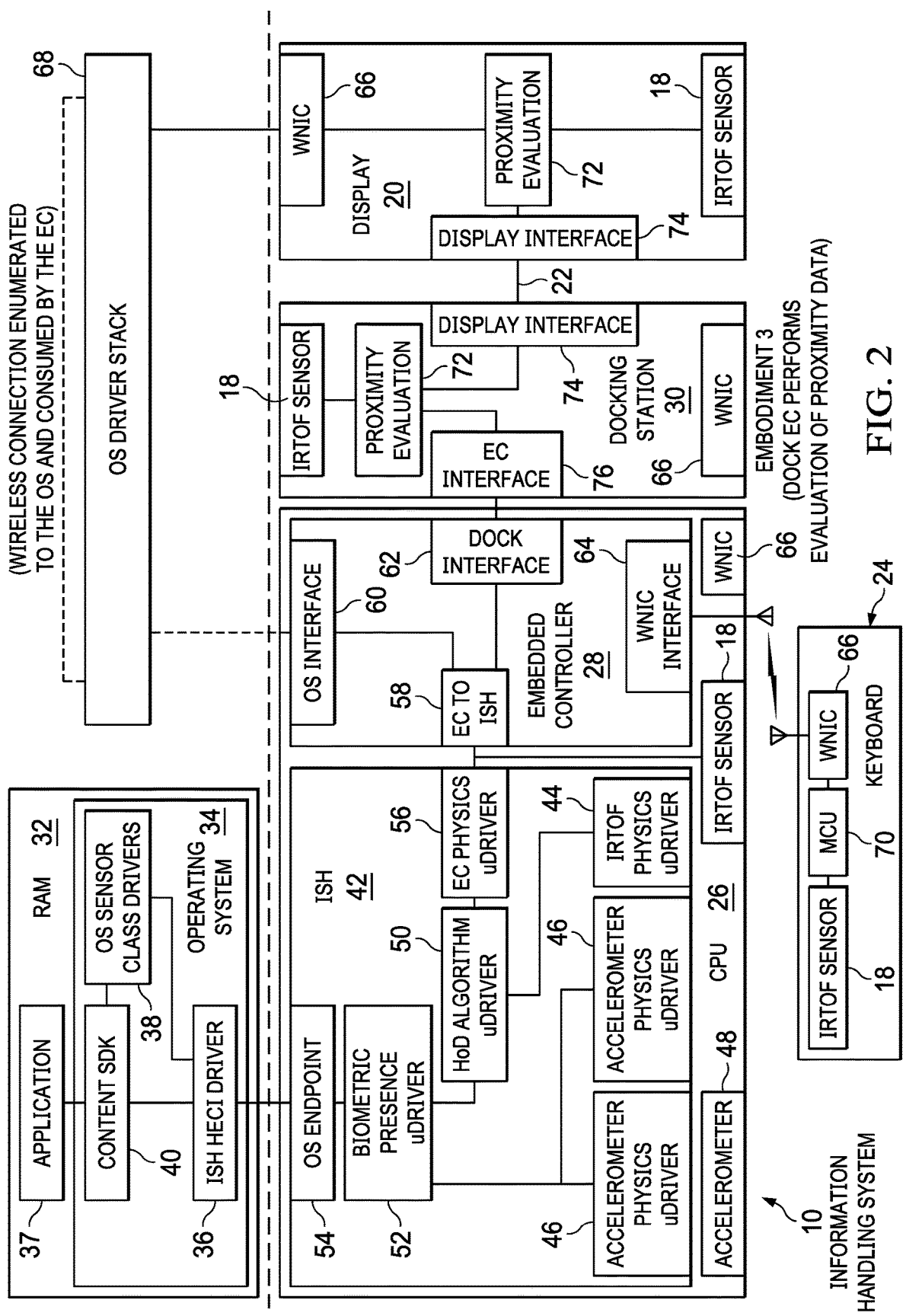
FIG. 2 depicts a block diagram of an information handling system interfaced with a peripheral display through a docking station to enhance user presence and absence detection with plural infrared time of flight sensors.

Referring now to FIG. 2, a block diagram depicts an information handling system 10 interfaced with a peripheral display 20 through a docking station 30 to enhance user presence and absence detection with plural infrared time of flight sensors 18. In the example embodiment, an infrared time of flight sensor integrates in information handling system 10, docking station 30 and peripheral display 20 to illustrate alternative types of communication interfaces for presence detection information. Information handling system 10 processes information with a central processing unit (CPU) 26 that executes instructions stored in memory, such as random access memory 32. For instance, an operating system 34, such as WINDOWS, supports execution of applications 37, such as web browsing, e-mail, word processing, etc. . . . . . Operating system 34 and applications 37 interact with an end user through inputs made at input devices, such as peripheral keyboard 24, and present information as visual images at display 20. Generally, infrared time of flight sensors 18 detect end user presence and absence to secure access to information when an end user is not present, such by sleeping presentation of visual images at display 20 and password locking inputs through peripheral keyboard 24. In the example embodiment, operating system 34 interfaces with CPU 26 to manage end user presence and absence with a Host Embedded Controller Interface 36, operating system sensor class drivers 38 and a context SDK 40 that analyzes infrared time of flight sensor 18 and other sensor information to apply user presence and user absence states based upon analysis of context at information handling system 10.

In the example embodiment, CPU 26 includes an integrated sensor hub (ISH) 42, such as that defined by INTEL, to interface with sensors, such as the infrared time of flight sensor, accelerometers, ambient light sensors, etc. . . . . For instance, ISH 42 has an infrared time of flight physical uDriver 44 that interacts with infrared time of flight sensor 18 and accelerometer physical uDrivers 46 that interact with accelerometers 48. Processing resources within ISH 42 execute an HoD driver 50 to manage infrared time of flight sensor 18 and a biometric presence uDriver 52 provides rapid embedded code processing of sensor inputs to generate user presence detection information applied by context SDK 40 with communication coordinated through an operating system endpoint 54. In addition, ISH 42 interfaces through an embedded controller physical uDriver 56 with embedded controller 28 that executes firmware embedded code stored in integrated flash memory. Embedded controller 28 interfaces to ISH 42 through an EC-to-ISH interface 58 and with operating system 34 through an operating system interface 60. Embedded controller 28 manages interactions of information handling system 10 with physical devices, such as I/O devices, power, cooling, and other physical functionalities. In the example embodiment, embedded controller 28 has a dock interface 62 to support power and communications with docking station 30 and a WNIC interface 64 to support communications with a wireless network interface card (WNIC) 66. As is generally evident from the block diagram, wired and wireless communications are supported between information handling system 10, docking station 30, display 20 and peripheral keyboard 24 through an operating system driver stack 68. Leveraging wired and wireless interfaces to communicate infrared time of flight sensor 18 presence detection information between information handling system 10 and peripherals allows operating system 34 to react with user presence and absence state determinations with enhanced probability of avoiding false positive and false negative determinations.

In one example embodiment, presence detection information generated at an infrared time of flight sensor 18 integrated in peripheral keyboard 24 is managed by a keyboard processor microcontroller unit (MCU) 70, such as a microcontroller unit, and communicated with wireless signals through a WNIC 66, such as Bluetooth. Embedded controller 28 serves as the peripheral keyboard 24 data consumer/listener in a conventional manner, such as by providing keyed inputs sent through wireless signals to the operating system. In addition to conventional keyed inputs, peripheral keyboard 24 communicates presence detection information of infrared time of flight sensor 18 through wireless signals. For instance, the presence detection information may include infrared time of flight sensor 18 raw distance information for detected objects, "smart" user presence and absence determinations made locally at peripheral keyboard 24, sensor settings like IR frequency, IR sensitivity and ambient light conditions, and other operating conditions of infrared time of flight sensor 18. ISH subscribes to the presence detection information through EC physical uDriver 56 so that the presence detection information of peripheral keyboard 24 is fed to biometric presence uDriver 52 for determinations of a user presence or absence state, similar to the presence detection information of infrared time of flight sensor 18 integrated in information handling system 10. In an alternative embodiment, peripheral keyboard 24 might interface through a wired cable, such as a USB cable, with a similar subscription of presence detection information provided through the cabled interface to ISH 42.

In the example embodiment, display 20 includes an infrared time of flight sensor 18 that may provide presence detection information through a wireless interface similar to that of peripheral keyboard 24 or through a wired interface supported by docking station 30. In an embodiment with proximity evaluation logic 72, display 20 applies presence detection information of infrared time of flight sensor 18 to determine a user presence and absence state and reports the determination through display cable 22 and display interfaces 74 to docking station 30, which in turns provides the user presence and absence states through an embedded controller interface 76 to embedded controller 28. Embedded controller 28 serves as an aggregator of user presence and absence state determinations from peripheral devices and provides the user presence and absence states to operating system 34 either through ISH 42 or operating system interface 60. As an alternative, raw presence detection information, such as detected distances and infrared time of flight operational configurations and conditions, may be communicated to embedded controller 28 for use by ISH 42 with a subscription as described above. Advantageously, embedded controller 28 provides support for operating system 34 to handle infrared time of flight sensor 18 presence detection information from peripheral devices as if the infrared time of flight sensor 18 were integrated locally within information handling system 10 or as a separate device with a binary presence and absence state output. Embedded controller 28 interrogates and receives notifications, evaluates presence detection determinations including through ISH 42 if necessary, and then provides context to operating system 34 through an operating system listening service, such as Windows Management Interface (WMI), HECI or ISH virtual microdrivers that subscribe to embedded controller 28 through I2C or other interfaces. Embedded controller 28 and ISH 42 cooperate to provide user presence detection with peripheral devices in a scalable and flexible platform software architecture to support plural infrared time of flight sensors for more accurate and probabilistic user presence and absence determinations.

Figure 3:
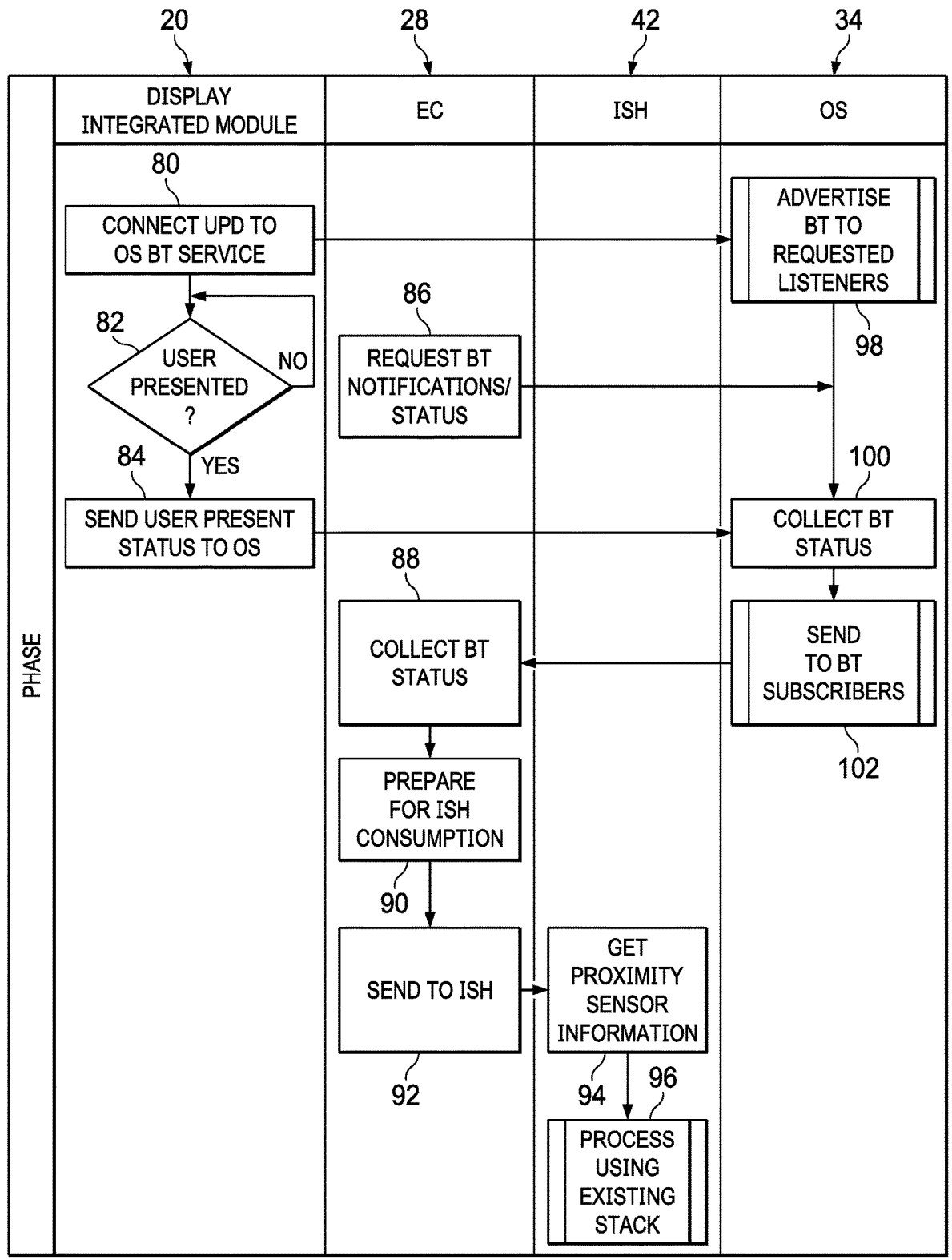
FIG. 3 depicts a flow diagram of a process for interfacing an infrared time of flight sensor integrated in a peripheral display with an information handling system through wireless communication.

Referring now to FIG. 3, a flow diagram depicts a process for interfacing an infrared time of flight sensor integrated in a peripheral display with an information handling system through wireless communication. The process starts at step 80 with a connection at the peripheral display 20 by wireless communication service, such as Bluetooth to the information handling system. At step 98, the information handling system operating system 34 advertises Bluetooth to the requested listener at the display. Once the wireless interface is established, the process continues to step 86 for the embedded controller to request notifications from the operating system related to the wireless interfaces, such as notifications of presence detection information. At display 20, the infrared time of flight sensor enters a detection loop at step 82 to determine if a user is present. Once a user is present, the process continues to step 84 to send the user present notification to the operating system with a wireless signal communication. In various embodiments, the communication at step 84 may include a variety of types of information, such as distances, raw sensor readings, user absent determinations and configuration settings.

Once the user presence is detected at step 84, the process continues to step 100 for operating system 34 to collect the user presence status at step 100. At step 102, the operating system 34 reports the user presence status to embedded controller 28, which collects the presence detection information at step 88. In response to collection of presence detection information at step 88, embedded controller 28 continues to step 90 to prepare the presence detection information for communication to ISH 42. For instance, embedded controller 28 may present the presence detection information as a virtual infrared time of flight sensor that mimics a physical time of flight sensor interaction with ISH 42. At step 92, embedded controller 28 sends the presence detection information to ISH 42, which receives the presence detection information at step 94 and applies the information at step 96. In one example embodiment, embedded controller 28 presents a virtual infrared time of flight device to ISH 42 so that ISH 42 may exercise control over the infrared time of flight sensor in display 20 as if it were a locally integrated sensor directly interfaced with ISH 42. For instance, ISH 42 may control configuration settings and retrieve raw sensor data and calibration information to fully leverage the infrared time of flight sensor.

Figure 4:
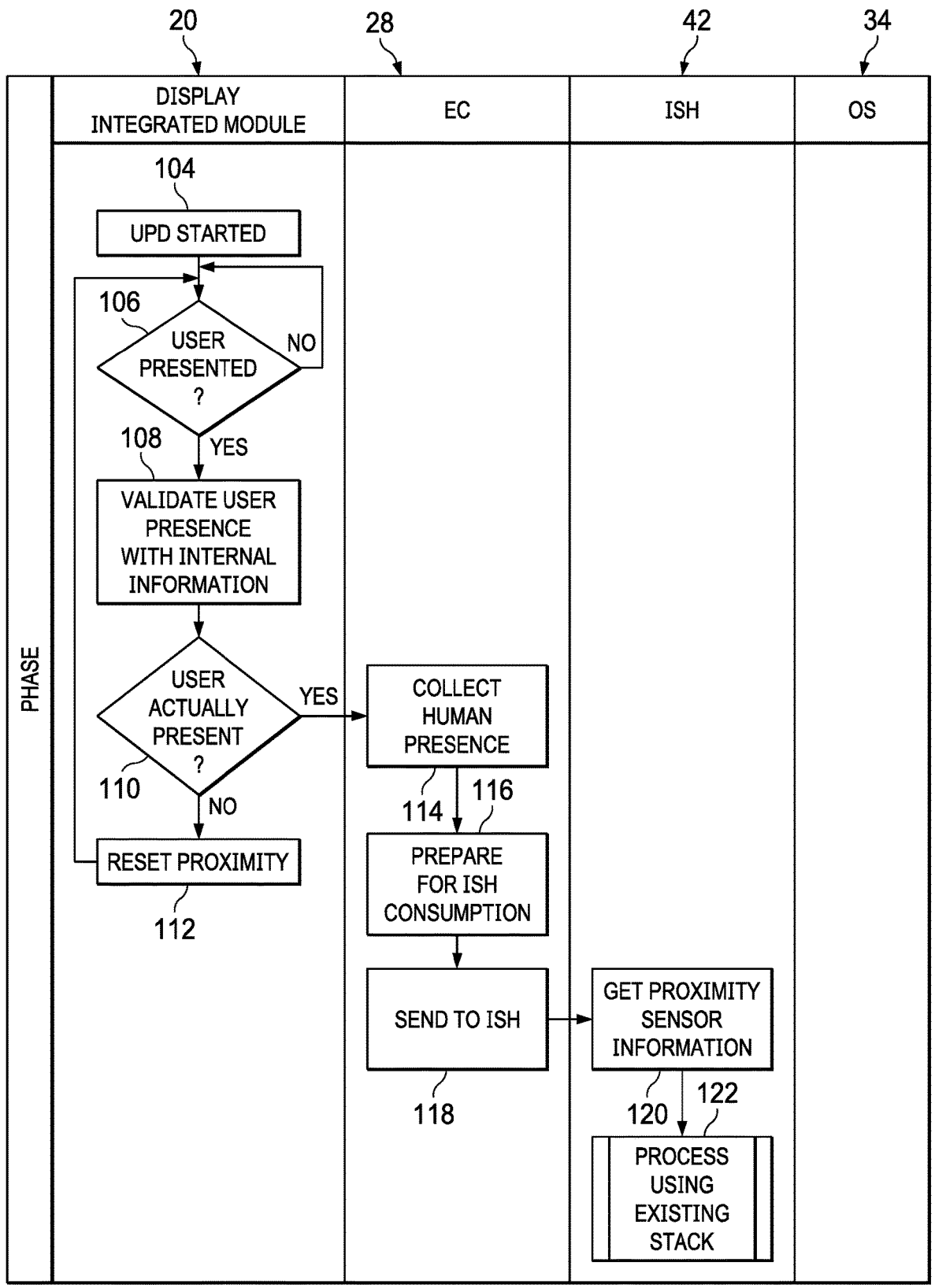
FIG. 4 depicts a flow diagram of a process for interfacing an infrared time of flight sensor integrated in a peripheral display with an information handling system through a cable interface.

Referring now to FIG. 4, a flow diagram depicts a process for interfacing an infrared time of flight sensor integrated in a peripheral display with an information handling system through a cable interface. The process starts at display 20 and step 104 with power up of the infrared time of flight sensor. At step 106, a loop monitors for end user presence and, when detected continues to step 108 to validate the end user presence with internal information, such as indications of user presence by touch or key inputs. At step 110, a determination is made of whether the user's presence is validated. In one embodiment, such validation may involve a comparison with other indicia of presence to conclude a minimal probability of a correct user presence determination. If the user presence is not validated, the process continues to step 112 to reset the infrared time of flight sensor and return to monitor for user presence at step 106. Once end user presence is validated at step 110, the process continues to step 114 to collect the user presence information and step 116 to prepare the presence detection information for communication to ISH 42. At step 118 the presence detection information is communicated to ISH 42, which at step 120 gets the proximity sensor information and at step 122 processes the information. As described above with response to the Bluetooth communication, ISH 42 may support interactions with infrared time of flight sensors in peripheral devices as if integrated in the information handling system and directly interfaced with ISH 42.

Figure 5:
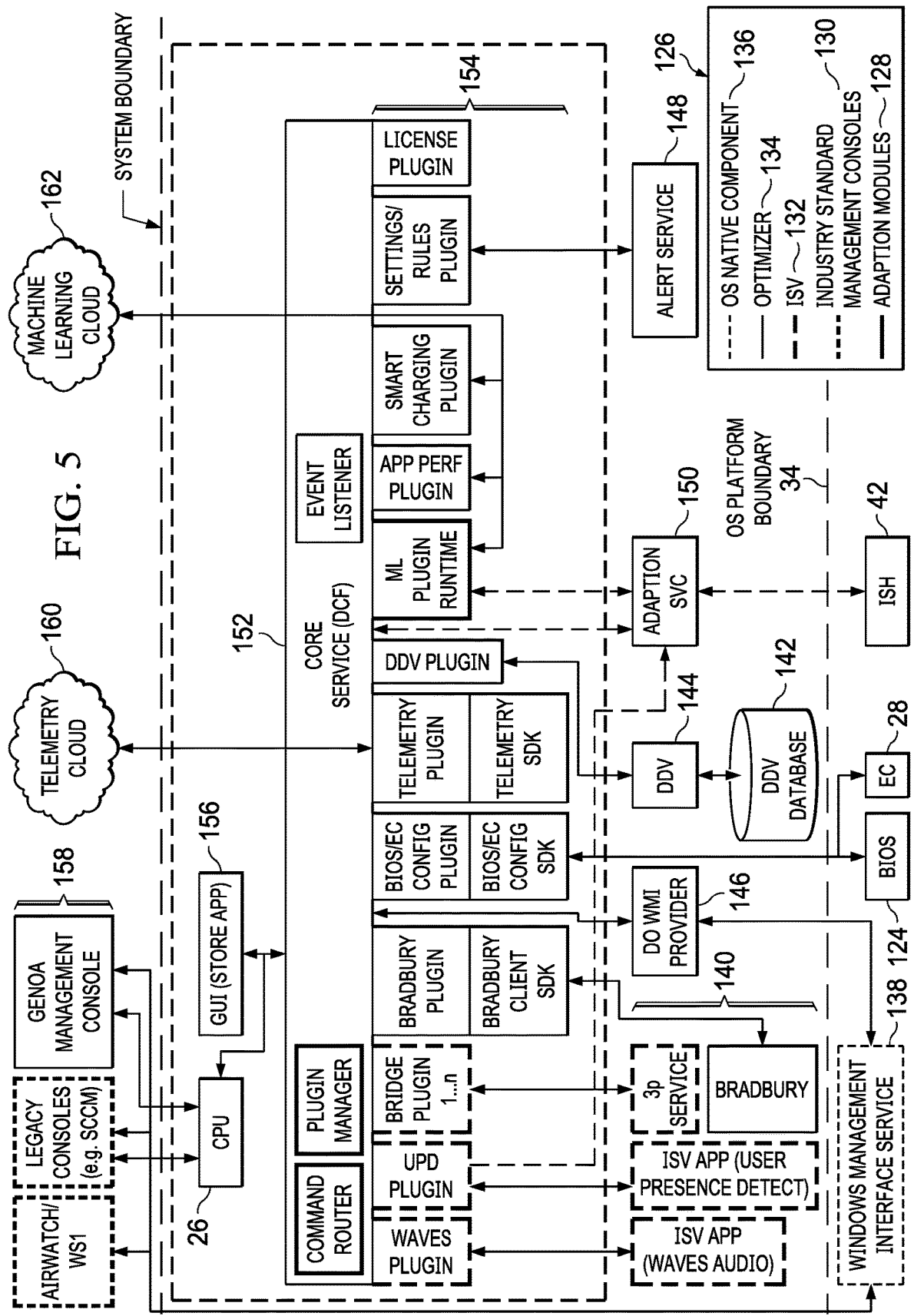
FIG. 5 depicts a block diagram of an information handling system configured to adapt infrared time of flight sensor detection in real time to adjust information handling system interactions, such as presentation of notifications.

Referring now to FIG. 5, a block diagram depicts an information handling system configured to adapt infrared time of flight sensor detection in real time to adjust information handling system interactions, such as presentation of notifications. One goal of the use of infrared time of flight sensors to monitor end user presence and absence is that the rapid response time for detection of presence and absence provides an "always ready" experience for an end user. To enhance this experience, infrared time of flight sensors are adaptively configured to changing conditions so that false positive determinations of user presence and user absence do not disrupt end user interactions with untimely display sleeps or jeopardize end user security with inadvertent end user accesses. A number of different techniques may be applied to infrared time of flight sensor presence detection information to avoid false positive actions. For example, a timeout of varied lengths may be used before taking an action in response to a change between user present and user absence states. As another example, a probability of a false detection may be tracked based upon operating conditions, such as the number of infrared time of flight sensors, their correlation in sensed information, and operating conditions associated with accuracy of each sensor, such as ambient light conditions. In various embodiments, different actions may be performed at different probabilities of the accuracy of user presence and user absence states. For instance, notifications may be halted at a lower probability of a user absence state accuracy while the screen remains awake. In this way, the user is not disrupted by a screen sleep while notification information is withheld until a higher probability exists that the end user is present. To achieve accurate indications of end user presence and absence states and to track a probability that end user presence and absence states are accurate, conditions at the information handling system and any peripherals are analyzed to adjust the configuration of infrared time of flight sensors. Over time, infrared time of flight sensor user presence and absence determinations are analyzed to model accuracy in different conditions, such as different physical locations, different environmental conditions, different numbers of end users, different types of peripherals, etc. . . . . These models are saved as configuration parameters in association with the conditions in which the configuration parameters are developed and loaded at the information handling system in response to detection of similar conditions.

In the block diagram, embedded controller 28 and ISH 42 coordinate to execute a variety of software elements, including a BIOS 124. An operating system adaption service 150 executes over operating system 34 as part of an optimizer 152 core service that manages an end user experience. An operating system stack 126 supports execution of the optimizer 152 core service with operating system native components 136, optimizer layer 134, independent software vendor layer 132, standard management console layer 130 and adaption modules 128. Within the optimizer 152 core service, a variety of plugin modules 154 support different functions. As an example, Waves, Bradbury and Bridge plugins provide support for software feature components 140 that sit within the software framework to provide customized functions, such as audio, management and communication functions. Storage is provided with a data vault 144 that manages a database 142 through a data vault plugin. Operating system command interactions are communicated between a Windows Management Interface (WMI) 138, an optimize WMI provider 146 and a command router within optimizer 152 core service. External interactions through network communications are supported from a variety of network locations 158 with graphics defined by a GUI application store 156. In the example embodiment, a telemetry plugin of optimizer 152 core service supports an interface with a telemetry network location 160 and a machine learning plugin supports an interface with a machine learning network location 162. An alert service 148 interfaces with a settings/rules plugin of optimizer 152 core service and manages presentation of notifications at information handling system 10, as described in greater depth below. An adaption service 150 interfaces through a machine learning (ML) plugin to manage configuration parameters of infrared time of flight sensors and of reactions to end user presence and absence states as described in greater detail below.

Optimizer 152 core service interfaces adaption service 150 with machine learning network location 162, such as virtual machine server located in cloud, to model user presence detection off line and provide real time configuration parameter inferences and reinforcement. A false determination configuration policy is pushed by optimizer 152 core service based upon historical user presence and absence state determinations modeled for accuracy locally and remotely. Adaption service 150 adaptively changes user presence detection parameters and false determination logic based upon this historical context and machine learning. FIG. 6 illustrates an example of a false determination configuration policy that results from machine learning reinforcement. In the example embodiment, a plurality of use cases are defined based upon different physical locations, such as at the user's office cube, a public café, a home office, etc. . . . . Parameters considered in each policy may include color at each location, available peripheral devices, the number of infrared time of flight sensors available, portable housing rotational orientation, accelerations, and other factors. Model parameters may include historical user presence and absence detection, wait times enforced after a change between presence and absence states, validation and invalidation of a user presence state transition, environmental conditions, a number of infrared time of flight sensors available, an expected probability associated with each determined user presence and absence state, etc. . . . . In various embodiments, various types of parameters may be detected and applied to configure end user presence detection.

As an example, adaption service 150 manages user detection parameters by storing a configuration parameter model in database 142 and loading the configuration parameter model to the application performance plugin to determine optimal user presence detection parameters. Once the optimal user presence detection parameters are determined, adaption service 150 interfaces with firmware of ISH 42 to push the optimal user presence detection parameters to available infrared time of flight sensors, such as those integrated in the information handling system and in peripheral devices. Optimizer core service 152 loads the configuration policy to adaption service 150. As user presence and absence states are determined with the configuration policy, a user presence detection plugin of optimizer 152 core service determines false user presence state transitions, such as based upon end user reactions to actions performed at information handling system 10, like waking a system as it sleeps or detecting end user activity after a user absence determination and before the system sleeps. False user presence state transitions are logged with associated sensed parameters to local analysis to adjust the configuration policies and to pass to machine learning network location 162 for more in depth analysis.

Alert service 148 manages notifications presented to an end user during user presence, such as operating system notifications that include application information (emails, social media posts, etc. . . . ) and also hardware notifications generated by BIOS 124 and/or embedded controller 28, like battery charge states for the information handling system and peripherals, such as keyboard and stylus battery charge. For instance, alert service 148 queues notifications in the event that a predetermined probability exists based upon user presence detection parameters that an end user is absent, even if the display remains awake because the probability of end user absence is not high enough to sleep the display. Similarly, if alert service 148 maintains notifications in queue after a user presence state wakes the display for the sleep state until a sufficient probability is established that the end user is present. The confidence in a user presence or absence state may be determined from the configuration policy and the sensed environment. In one example embodiment, confidence in a user state transition may be determined from validations and invalidations of the user state transitions over time, such as based upon end user responses to information handling system actions performed based upon user presence state transitions. In one embodiment, as notifications are queued, the notifications are filtered for relevance, such as removing time sensitive notifications that lose relevance after passage of time, and are prioritized to aid in presentation of more relevant notifications when the end user presence is confirmed and attention to presented information is highest. For instance, a low battery state notification for the information handling system, keyboard or stylus might have a highest priority to prevent failure due to power loss. Other notifications may be prioritized based on end user interactions with notifications over time.

Figure 7:
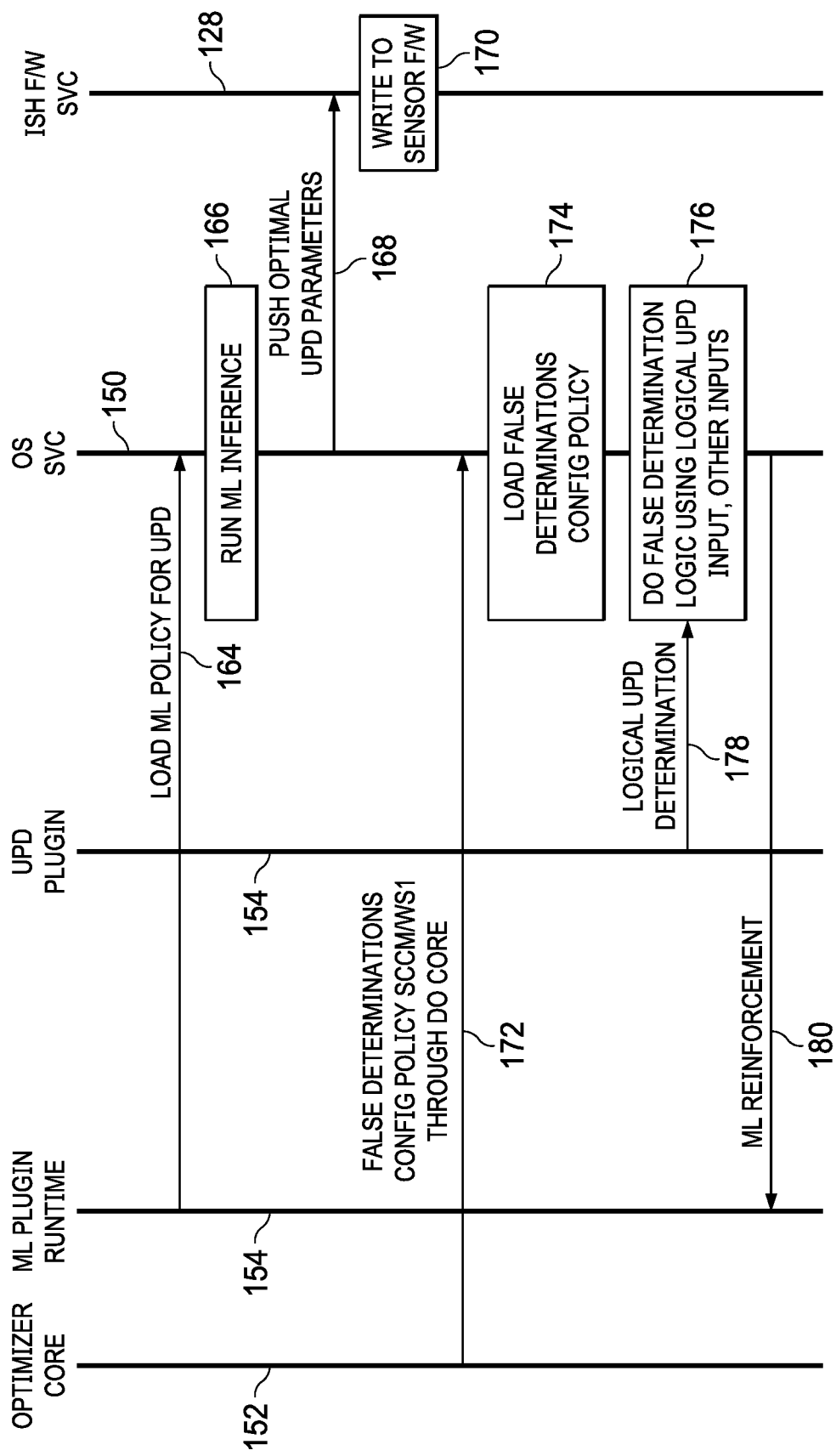
FIG. 7 depicts a flow diagram of a process for adapting user presence detection configuration policies based upon user presence state transitions and validations.

Referring now to FIG. 7, a flow diagram depicts a process for adapting user presence detection configuration policies based upon user presence state transitions and validations. The process starts with optimizer 152 managing user presence detection configuration policies through a machine learning plugin and user presence detection plugin. At step 164, a machine learning policy for user presence detection is loaded from the machine learning plugin 154 to the operating system service 150 where the machine learning inference is executed to determine optimal user presence detection policy configuration parameters at step 166. Once the optimal user presence detection parameters are determined, the process continues at step 168 to push the user presence detection policy configuration parameters to the ISH firmware service 128. At step 170, the configuration parameters are written to the infrared time of flight sensor or sensors. As infrared time of flight sensor user presence and absence state transitions are detected, false determinations of user presence or absence states are determined at step 176 according to the configuration policy communicated at step 172 and loaded at step 174 at the adaptation service 150. At step 178 logical user presence detection determinations are made at optimizer 152 core service with application of the configuration policies, such as may be shown by inputs made at input devices that indicate a false user absence determination or an excessively delayed transition to a wake state at a user presence determination. As user presence and absence state transitions are validated and/or invalidated, a log is maintained so that at step 180 machine learning reinforcement of configuration policies may be applied.

Figure 8:
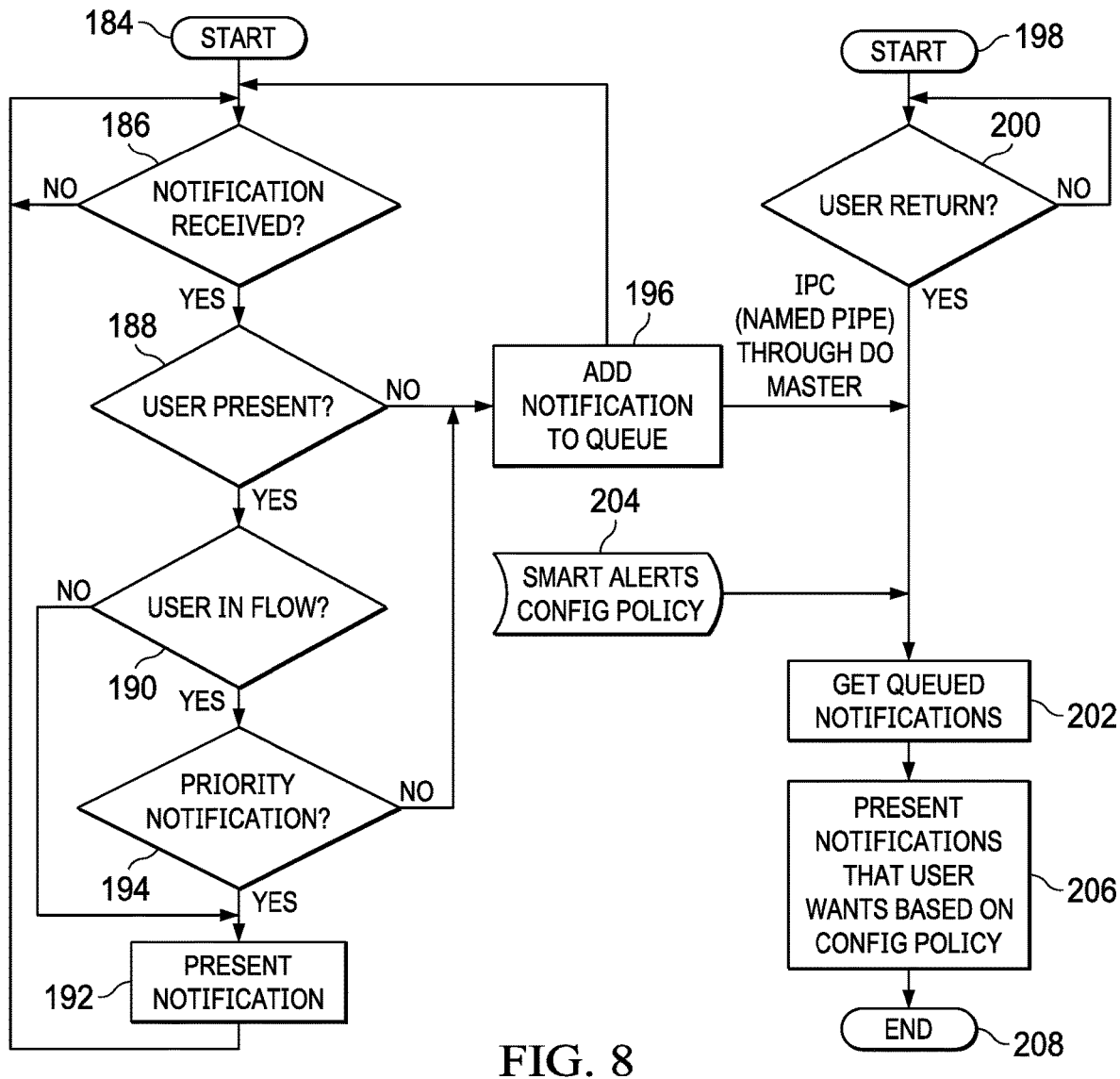
FIG. 8 depicts a flow diagram of a process for queuing and presenting operating system and hardware notifications to an end user based upon user presence and absence state transitions.

Referring now to FIG. 8, a flow diagram depicts a process for queuing and presenting operating system and hardware notifications to an end user based upon user presence and absence state transitions. The process starts at step 184 with monitoring at step 186 with the optimizer core service through a plugin of notifications generated by hardware and software. Once a notification is detected, the process continues to step 188 to determine if the end user is present. If the user is not present, the process continues to step 196 to add the notification to the queue. If the user is present, the process continues to step 190 to determine whether the notification should be presented immediately or queued for subsequent presentation. At step 190 a determination is made of whether the user is in an active work flow, in which case the notification might detract from attention to other tasks. If the user is in the flow, a determination is made at step 194 of whether the notification is a priority notification, such as a hardware notification of low battery charge or priority notifications configured by the end user. If the notification is not a priority, and the user is in the flow, the process continues to step 196 to add the notification to the queue. If at step 190 the user is not in the flow or at step 194 the notification is a priority, the process continues to step 192 to present the notification and returns to step 186.

At step 196 a queue of notifications is stored and maintained accessible by the optimizer. The optimizer starts at step 198 upon entry to an end user absent state and monitors at step 200 to detect a return of the end user with a transition to a user presence state. Once user presence is detected, the notification queue is checked to determine if it is populated based upon a smart alert configuration policy. For instance, notifications may be delayed for a short time after the user presence state to validate the user presence or to allow other end user priorities to be performed before initiating presentation of queued notifications. At step 202 the queued notifications are retrieved and at step 206 the queued notifications are presented with a filter applied based upon the configuration policy 204, such as with a predefined priority of with lower priority or irrelevant notifications removed. The process ends at step 208.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information;
   a graphics processor disposed in the housing and interfaced with the processor, the graphics processor operable to process the information to defined visual images for presentation at a display;
   a display integrated in the housing and interfaced with the graphics processor, the display operable to present the visual image;
   an embedded controller disposed in the housing and interfaced with the processor, the embedded controller operable to coordinate communications of input devices to the processor;
   an infrared time of flight sensor integrated in the housing and interfaced with the processor, the infrared time of flight sensor operable to detect end user presence detection information; and
   a notification module stored in non-transient memory and operable when executed on the processor to apply the end user presence detection information to selectively queue notifications generated for presentation to an end user, to withhold queue notifications from presentation at the display, and to selectively present the notifications at the display based upon user presence detection information, the notification module withholding notifications from presentation at the display when the display presents visual images that include content of the end user and the user presence information indicates the user is absent.

2. The information handling system of claim 1 wherein the notification module selectively queues notifications independent of whether the display presents visual images or sleeps.

3. The information handling system of claim 2 wherein the notification module selectively queues notifications based upon the infrared time of flight sensor indicating a first probability of a user absence state and the display sleeps based upon a second probability of a user absence state, second probability greater than the first probability.

4. The information handling system of claim 3 wherein the notification module selectively presents queued notifications based upon the infrared time of flight sensor indicating first probability of a user presence state and the display wakes from sleep based upon a second probability of a user presence state, the first probability greater than the second probability.

5. The information handling system of claim 1 wherein the notifications comprise:
   hardware notifications tracked by the embedded controller; and
   software notifications tracked by an operating system executing on the processor.

6. The information handling system of claim 5 wherein the hardware notifications comprise a battery charge state of a peripheral device interfaced with the information handling system.

7. The information handling system of claim 6 wherein the peripheral device comprises an active stylus configured to make touch inputs at the display.

8. The information handling system of claim 1 wherein the notification module is further operable to present the queued notifications with a predetermined priority.

9. The information handling system of claim 8 further comprising an adaption module stored in the non-transient memory and operable when executed on the processor to monitor end user interactions with the notifications to define the predetermined priority.

10. A method for presenting notifications at an information handling system display, the method comprising:
    monitoring an infrared time of flight sensor to determine end user presence and end user absence at the information handling system; and
    in response to detecting a first predetermined end user absence state, queuing notifications generated at the information handling system without presentation of the notifications at the display when the display presents content of the end user;
    in response to detecting a second predetermined end user absence state, sleeping presentation of visual images at the display;
    in response to detecting a first predetermined end user presence state, waking the display to present the visual images without presentation of the queued notifications at the display; and
    in response to the detecting a second predetermined end user presence state, presenting the queued notifications at the display.

11. The method of claim 10 wherein:
    the first predetermined user absence state has a lower probability of a user absence than the second predetermined user absence state; and the first predetermined user presence state has a lower probability of a user presence than the second predetermined user presence state.

12. The method of claim 10 further comprising:
prioritizing the queued notifications according to a predetermined priority; and
in response to detecting the second predetermined end user presence state, presenting the notifications according to the predetermined priority.

13. The method of claim 12 further comprising:
monitoring end user interactions with the notifications; and
analyzing the end user interactions to adjust the predetermined priority.

14. The method of claim 10 wherein the notifications comprise hardware notifications and software notifications.

15. The method of claim 13 wherein the hardware notifications comprise a peripheral device battery state.

16. The method of claim 10 wherein the first and second predetermined end user absence states vary based upon a number of infrared time of flight sensors monitoring end user presence and absence.

17. The method of claim 16 further comprising:
monitoring end user presence and absence with a first infrared time of flight sensor integrated in the information handling system; and
monitoring end user presence and absence with a second infrared time of flight sensor integrated in a peripheral device interfaced with the information handling system.

18. A system for presenting notifications at an information handling system display, the system comprising:
an infrared time of flight sensor integrated in the information handling system; and
non-transitory memory integrated in the information handling system and storing instructions that when executed on a processor:
monitor the infrared time of flight sensor to determine end user presence and end user absence;
in response to a first end user absence state, queuing notifications generated at the information handling system while the display presents visual images that includes content of the end user and withholds presentation of queued notifications; and
in response to a second end user absence state, sleeping the display from presenting visual images.

19. The system of claim 18 wherein the instructions when executed on a processor further:
in response to a first end user presence state, wake the display from sleep to present the visual images to include content of the end user and not including queued notifications; and
in response to a second end user presence state, presenting the queued notifications when the display presents visual images.

20. The system of claim 19 wherein the instructions when executed on the processor further prioritize presentation of notifications related to peripheral device battery charge states.

* * * * *